2 Sheets—Sheet 1.
E. V. WINGARD.
Drier for Lumber and other Material.
No. 239,906. Patented April 5, 1881.
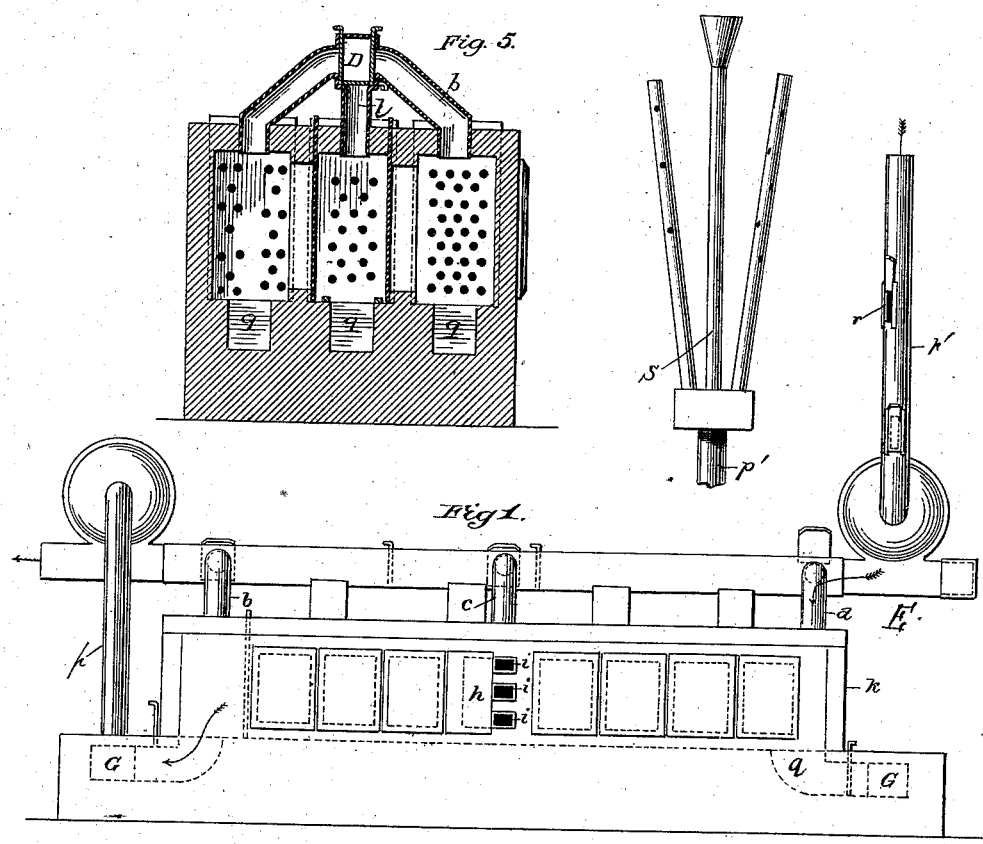
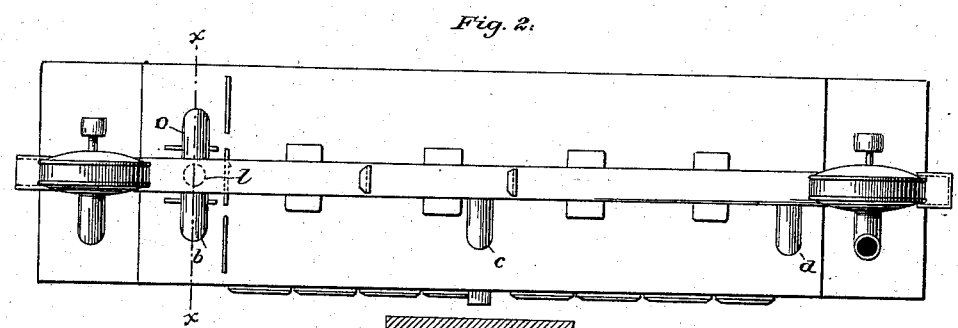
Witnesses:
C. Clarence Poole
F. L. Middleton
Inventor:
Edwin V. Wingard
By Elmer Speer
Atty E. V. WINGARD.
Drier for Lumber and other Material.
No. 239,906. Patented April 5, 1881.
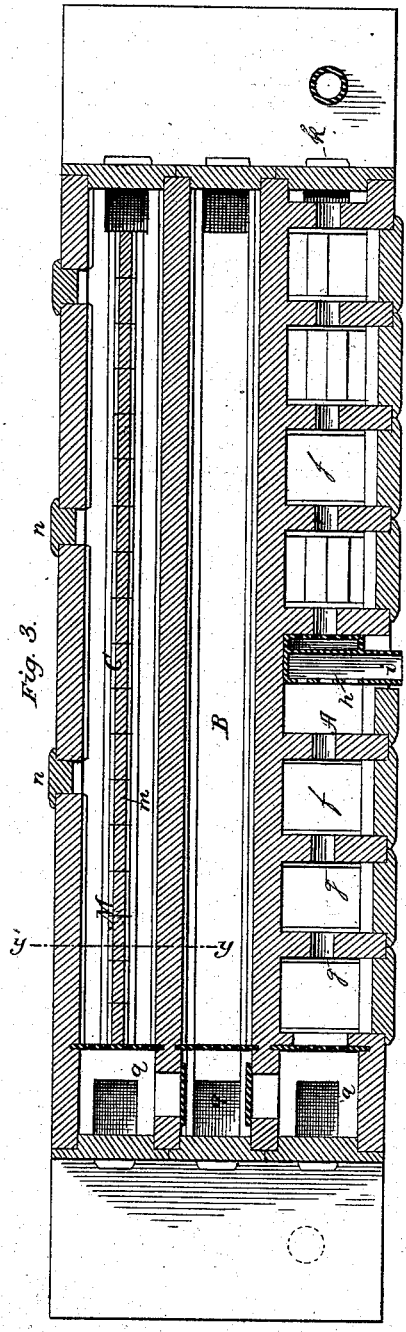
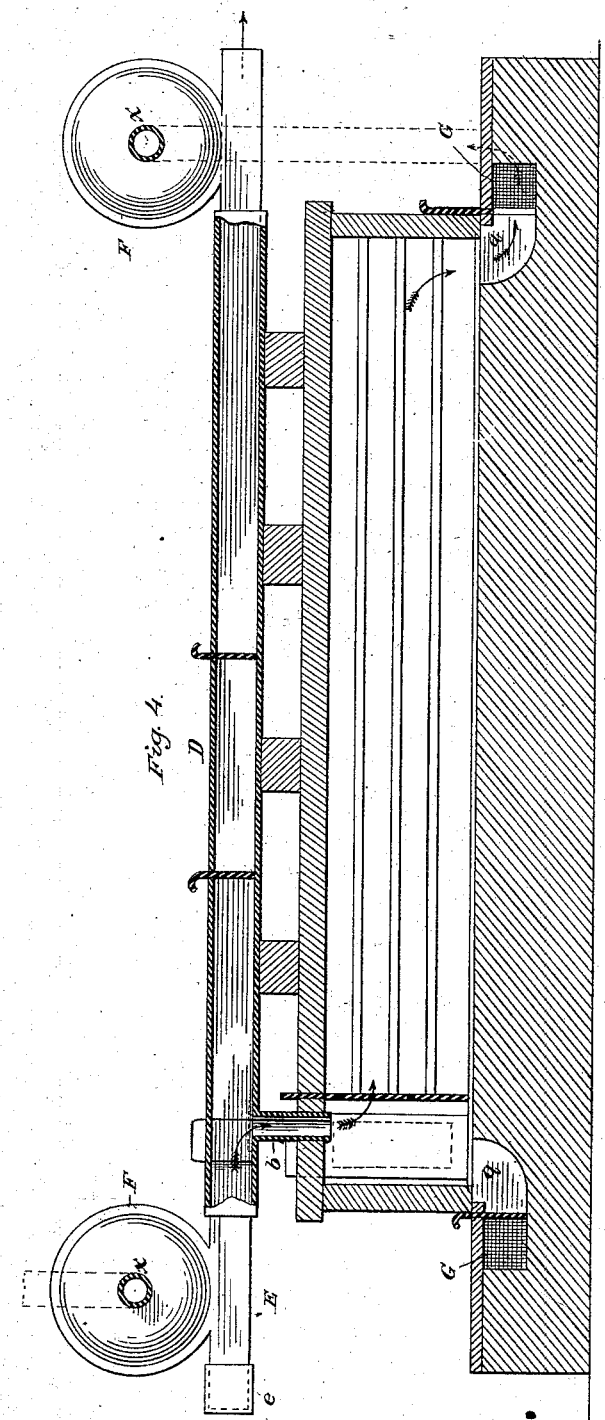
Witnesses:
C. Clarence Poole
F. L. Middleton
Inventor:
Edwin V. Wingard
By Ellis Spear
Atty

UNITED STATES PATENT OFFICE.

EDWIN V. WINGARD, OF VINCENNES, INDIANA.

DRIER FOR LUMBER AND OTHER MATERIALS.

SPECIFICATION forming part of Letters Patent No. 239,906, dated April 5, 1881.

Application filed October 25, 1879.

*To all whom it may concern:*

Be it known that I, EDWIN V. WINGARD, of Vincennes, in the county of Knox and State of Indiana, have invented a new and useful Improvement in Driers; and I do hereby declare that the following is a full, clear, and exact description of the same.

My invention relates to driers for lumber and other materials, of that class in which heated air is forced over or through and over the material to be dried.

It consists of various details of construction, whereby the apparatus is made more efficient and convenient in use, all as hereinafter fully set forth.

In the drawings hereunto attached, and forming part of this specification, Figure 1 represents a side elevation of my improved drier. Fig. 2 represents the top of the same. Fig. 3 represents a section taken horizontally through the body of the main drying-trunks. Fig. 4 is a vertical section taken longitudinally through the central drying-trunk and through the main pipe. Fig. 5 is a cross-section on line $x\,x$, Fig. 2; Fig. 6, a cross-section on the line $y\,y$, Fig. 3.

In the apparatus represented in the drawings, which show the invention in the form in which I have embodied it, there are three main trunks, (marked, respectively, A, B, and C.) These trunks differ in internal construction and arrangement, and the details of these special constructions and arrangements are hereinafter fully set forth. They are all adapted to hold lumber or other material to be dried, and to allow a free circulation of drying air throughout their length over the material to be treated. Above these trunks I have also represented a main conducting-pipe, (marked D.) As represented in the drawings, this main conducting-pipe is located centrally above the drying-trunks, and extends from one end to the other. This is the preferable arrangement; but this pipe may be also used with advantage, in some cases, arranged below the drying-trunks.

As the drier belongs to that class which require a forced circulation of air, I connect at one end of the main conducting-pipe either a blower or an exhauster. The air-forcing devices may, however, be placed at both ends of the conducting-pipe, the blower at one end forcing air into the pipe and trunk, which is withdrawn by the exhauster at the opposite end. In order that the same apparatus at either end may serve the purpose of blowing or exhausting, I have provided these blowers (or one, if only one is used) with a reversible mouth-piece. This reversible mouth-piece is represented at E, the blowers attached thereto being marked F. The mouth-piece E has a cap, $e$, by means of which it may be closed. The case which contains the fan-blower is attached centrally to this mouth-piece, the construction and shape of which, being similar at both ends, adapts either end for insertion into the conducting-pipe. The blower-case is provided with an axially-arranged opening in the side, (marked $x$ in Fig. 4,) and the construction is such that the blower may take in air through the remote mouth-piece, from which the cap $e$ has been removed, and discharge the same through the opening $x$, causing an exhaust; or it may draw in air through the opening $x$ and force it through the reversed mouth-piece into the interior of the drier, the cap $e$ cutting off communication with the atmosphere.

It will be observed that the main conducting-pipe has branch pipes on one side (marked $b$, $c$, and $d$) entering the trunk A—the first and last at the end, and the second in the middle.

The trunk A is divided into compartments $f\,f$, placed transversely, each one of which has a door arranged upon the side. The transverse partitions between the compartments are perforated with holes $g$, to admit the circulation of air from one compartment to another throughout the entire trunk or section of the trunk. The central partition in the trunk A divides the trunk into two sections, which may be used independently of each other. The middle branch pipe, $c$, opens into the end of the left-hand section, Fig. 1, through the box $h$, which has openings communicating with the left-hand section, and also openings into the right-hand section, which openings may be closed, if desired, by any suitable kind of valves. From the box $h$ are also openings $i$, discharging into the open air outside the trunk. These also may be closed, if desired, by any suitable kind of cover or valve. The compartments in each section are essentially alike in construction and mode of communication with each other, and are provided on each side with ledges to sustain trays for holding material to be dried.

Manifestly, each section of the main trunk A may be used independently of the other, or both may be used together. The air may be forced down through the main conducting-pipe, through the branch pipe $b$, and may be discharged through the openings $i$, or exhausted through the branch pipe $c$, in case the valve in the main conducting-pipe between the branch pipes $b$ and $c$ is closed, and the exhaust-fan is used on the opposite end of the apparatus; or, if the orifices $i$ are closed and those between the sections are open, the said blast may be forced through the entire length of the trunk A, there being openings in the partitions, in range with the tiers of trays, for the purpose of allowing exit for the air, with the moisture taken up in its passage through the material. These exit-openings may, however, be closed by a door, $k$, and the air with its accumulated moisture be exhausted through the pipe $d$, in the same manner as heretofore explained in connection with the left-hand section.

The trunk B, centrally located, extends from end to end without transverse partitions, and is provided with ledges upon its walls for supporting shelves, or with a railway-track, upon which trucks or cars may be run containing the material to be dried. This central trunk communicates with the main pipe by means of the vertical pipe $l$, so that air may be forced out of said main pipe through the entire length of this central trunk and through openings at its ends, or by the reverse operation of the blower the current of air may be passed in the opposite direction, being exhausted through the pipe $l$.

The third trunk, c, extends uninterruptedly from end to end, and is provided with a central movable partition, M, made up of sections $m$, these sections being held in place by a groove in the roof and floor, either cut therein or formed by lateral strips. The walls of this trunk and the partition may be provided with ledges for the support of trays, and the trunk may have upon the floor a railway-track, if desired. The trunk may be used either with or without the partition, according to the nature of the material to be dried. The side doors, $n\ n$, are provided in this trunk for convenience of access, both in introducing the sections of the partition and pushing them along into place, or to admit the discharge of material. An arrangement of devices similar to those described in connection with the trunk B is provided for the introduction and discharge of the air. These consist of a branch pipe, $o$, communicating with the main pipe, opposite the branch pipe $b$, and openings in the opposite end of the trunk. The branch pipe $o$ is provided with a valve, in the same manner as the other branch pipe, for shutting off communication with the main pipe, whenever that may be found desirable.

The current of air may be reversed in the trunk C, in the same manner as in the other trunks. The movable partition may be introduced from the end, and may be put up as the drying-trunks are charged, and removed as they are discharged; or this drying-trunk may be charged and discharged by passing the trays into it at the side doors, then placing them on the ledges fastened to the sides for their support, and sliding them along to their places.

Across the lower end of these drying-trunks A B C, and below the lower level of said trunks, are regulating-trunks G G. These may be built of fire-proof material, and be used for generating or distributing heated air, as in the "Bingham Drier." These regulating-trunks may be connected with the exhauster or blower by the pipe $p$, and with the main drying-trunks by channels $q\ q\ q$, whereby perfect communication may be established between the blower and exhauster at either end, or both, with any one or all of the main drying-trunks. All these channels, having communication between the main drying-trunks and the distributing-trunks, are provided with valves, whereby any one or all of them may be shut off, if desired.

Whenever rapid drying is desired the valve between the drying trunk or trunks to be operated and the regulating-trunk is removed, the pipe $p$ made to connect the regulating-trunk with the blower, arranged as an exhaust-fan, and the reversible mouth-piece uncovered, when the exhaust-fan will draw the air from the regulating-trunk and from the drying-trunk, which may be connected therewith.

The pipe $p'$, which is provided with slide-valves $r$, may be used to regulate the temperature by admitting cold air from the outside when the heat is too great for the material to be dried. This pipe $p'$ may be connected with the blower and then extended to join the heat-collecting pipe S, which may extend, with its branches, to a burning-kiln top or a cemented floor or metallic roof, or any place where solar or artificial heat can be collected.

Supposing, now, that the reversible mouth-piece upon one end of the apparatus, having its branch pipes communicating with all the trunks, is arranged so that the fan will act as a blower, and supposing that the heat-collecting pipe S is connected to the said blower and the reversible mouth-piece is closed, then the heated air brought from the pipe S may be driven into any one or all of the main drying-trunks at pleasure, the valves being properly arranged, and the fan at the other end being properly arranged to exhaust, with its mouth-piece open, and draw the air through the pipe $p$ from the distributing-trunk at that end, and thus increase the circulation of air or force of the current caused by the blower at the other end.

It will be apparent from the description heretofore given, and by an inspection of the drawings, that the apparatus is capable of operating in various modes, according to the arrangement of the pipes and valves.

The trunks may be built of any size required, and of material ordinarily used for such purposes, and suitable foundation may be provided for the blowers, to which they may be bolted in any convenient manner. The trunks, manifestly, should be made as air-tight as possible. Any one of the three shown may be used, or the number may be increased, if desired.

I am aware that kilns have been made in sections with a main pipe, and branch pipes connecting said main pipe with each section, as shown in the patent of Whittemore, No. 75,096, of March 3, 1868.

Having thus described my invention, what I claim as my invention, and desire to secure by Letters Patent, is—

1. A drying-trunk consisting of a series of chambers or sections, said sections having side doors and trays arranged upon ledges, and adapted to be introduced through said side doors, and having also perforations in the transverse partitions, in combination with a main pipe, branch pipes, and a blower or exhauster, whereby a blast of air may be forced through the entire length of the trunk, as set forth.

2. In combination with the trunk A, composed of a series of sections, as described, a central transverse partition and box, $h$, and the described connections with the main conducting-pipe, whereby the whole trunk or either half may be used, as set forth.

3. The combination, in a drier, of the trunks A and C, having side doors, and of the central trunk, B, with a main pipe, D, branch pipes, and air-forcing devices, as described and shown, whereby the air may be forced through any one or all of the said trunks, as set forth.

4. The combination, with the trunks A, B, and C, adapted to admit the passage of air throughout their entire length, of the heat generating or regulating trunk or trunks, located at the ends, and below said drying-trunks, with the described connections and valves between said trunk G and said trunks A B C, and the blower, whereby air may be forced from the trunk G and through the main trunks, as set forth.

5. The combination, with the main trunks A, B, and C, and the trunk or trunks G, arranged at the ends of and lower than said main trunks, and connected thereto, as described, and with the main pipe D and air-forcing fan, of the pipe $p$, connecting said fan F and the said trunk G, as set forth.

6. A drying-trunk formed of stationary sides having horizontal ledges, and a sectional removable partition having like ledges, said ledges being adapted to receive or hold trays or pallets, for the purpose set forth.

7. A drying-trunk formed of stationary sides having horizontal ledges, and a sectional removable partition having like ledges, for the purpose set forth, said removable partitions fitting in cleats, as described.

8. A drying-trunk formed of the stationary sides and sectional removable partition having ledges for holding the trays or pallets, and having an exhaust-passage, for the purpose described.

9. A drying-trunk formed of the stationary sides and sectional removable partition having ledges for holding trays or pallets, and having the heat-supplying source, and the exhaust-passage, substantially as described.

10. In combination with the main trunk or trunks and main pipe and connecting-pipes, and with the fan F, the pipe $p'$ and pipe S, as and for the purpose set forth.

In testimony whereof I have signed my name to this specification in the presence of two subscribing witnesses.

EDWIN V. WINGARD.

Witnesses:
JOHN T. FREELAND,
FRED. HALL.